(12) United States Patent
Tagata et al.

(10) Patent No.: US 9,637,101 B2
(45) Date of Patent: May 2, 2017

(54) CYLINDER DEVICE AND VEHICLE BRAKE SYSTEM

(71) Applicants: NISSIN KOGYO CO., LTD., Ueda-shi, Nagano (JP); HONDA MOTOR CO., LTD., Minato-Ku, Tokyo (JP)

(72) Inventors: Kazuhiro Tagata, Ueda (JP); Nobuyuki Kobayashi, Ueda (JP); Motoyasu Nakamura, Ueda (JP); Yoshiyuki Takamatsu, Ueda (JP); Hideki Hidume, Ueda (JP); Kazuaki Murayama, Wako (JP); Nobutake Hyodo, Wako (JP)

(73) Assignees: Autoliv Nissin Brake Systems Japan Co., Ltd., Nagano (JP); Honda Motor Co., Ltd., Tokyo (JP)

( * ) Notice: Subject to any disclaimer, the term of this patent is extended or adjusted under 35 U.S.C. 154(b) by 99 days.

(21) Appl. No.: 14/868,524

(22) Filed: Sep. 29, 2015

(65) Prior Publication Data
US 2016/0090070 A1 Mar. 31, 2016

(30) Foreign Application Priority Data

Sep. 30, 2014 (JP) ................................. 2014-202241
Sep. 30, 2014 (JP) ................................. 2014-202242

(51) Int. Cl.
*F15B 11/08* (2006.01)
*B60T 11/16* (2006.01)
(Continued)

(52) U.S. Cl.
CPC .............. *B60T 11/16* (2013.01); *B60T 7/042* (2013.01); *B60T 8/4081* (2013.01);
(Continued)

(58) Field of Classification Search
CPC .................................. F15B 7/08; B60T 11/20
See application file for complete search history.

(56) References Cited

U.S. PATENT DOCUMENTS

| 4,550,567 A | 11/1985 | Schaefer |
| 4,774,809 A | 10/1988 | Hayashida et al. |
| (Continued) | | |

FOREIGN PATENT DOCUMENTS

| DE | 3241881 A1 | 5/1984 |
| DE | 102004014808 A1 | 11/2004 |
| (Continued) | | |

OTHER PUBLICATIONS

Extended European Search Report dated Jan. 26, 2016 for counterpart Application No. 15 187 368.4.

*Primary Examiner* — F. Daniel Lopez
(74) *Attorney, Agent, or Firm* — Carrier Blackman & Associates, P.C.; Joseph P. Carrier; William D. Blackman (57) ABSTRACT

A cylinder device includes a regulation mechanism that regulates separation distance between a front piston and a rear piston. A spring seat member of the regulation mechanism includes a spring reception part that projects toward a retainer side to receive a rear end of a spring, a cup seal holding part that projects on an opposite side from the retainer to hold a cup seal arranged on the rear piston, and a projection part that projects on the opposite side from the retainer. The projection part becomes abuttable on the retainer by a stroke of the rear piston if the spring reception part and the cup seal holding part are installed reversely-oriented on the rear piston.

16 Claims, 7 Drawing Sheets

(51) Int. Cl.
- *F15B 7/08* (2006.01)
- *B60T 7/04* (2006.01)
- *B60T 13/14* (2006.01)
- *B60T 13/66* (2006.01)
- *B60T 13/68* (2006.01)
- *B60T 13/74* (2006.01)
- *B60T 8/40* (2006.01)

(52) U.S. Cl.
CPC .......... *B60T 13/146* (2013.01); *B60T 13/662* (2013.01); *B60T 13/686* (2013.01); *B60T 13/741* (2013.01); *F15B 7/08* (2013.01)

(56) References Cited

U.S. PATENT DOCUMENTS

| | | | | |
|---|---|---|---|---|
| 4,932,312 A | * | 6/1990 | Sugimoto | B60T 11/20 137/508 |
| 5,970,711 A | * | 10/1999 | Kaneko | B60T 8/38 60/562 |

FOREIGN PATENT DOCUMENTS

| | | |
|---|---|---|
| EP | 1932736 A1 | 6/2008 |
| FR | 2458435 A1 | 1/1981 |
| GB | 2042662 A | 9/1980 |
| GB | 2098294 A | 11/1982 |
| JP | 2009-126355 A | 6/2009 |

* cited by examiner

CYLINDER DEVICE AND VEHICLE BRAKE SYSTEM

CROSS REFERENCE TO RELATED APPLICATION

This application claims the benefit of priority to Japanese Patent Application No. 2014-202241, filed on Sep. 30, 2014 and Japanese Patent Application No. 2014-202242, filed on Sep. 30, 2014, the disclosures of all of which are hereby incorporated by reference in their entities.

BACKGROUND OF THE INVENTION

Field of the Invention

The invention relates to a cylinder device and a vehicle brake system.

Description of the Related Arts

A cylinder device is conventionally known, as shown in, for example, Japanese Patent Application Publication No. 2009-126355 (see FIG. 6), which is used in a vehicle brake system that generates brake hydraulic pressure in response to control input on a brake operating element.

This cylinder device includes a front piston, a rear piston, and a regulation mechanism therebetween. The regulation mechanism includes a retainer that is fixed to a rear end of the front piston, a bolt that has its head engaged with a rear end of the retainer and is screwed into a front end of the rear piston, a spring seat member that is fixed to the front end of the rear piston by the screwed bolt, and a spring compressively arranged between the retainer and the spring seat member.

Arranged on the outer edge of the spring seat member are a spring reception part extending forward toward the spring and a cup seal holding part extending backward toward a cup seal.

SUMMARY OF THE INVENTION

In the cylinder device according to Japanese Patent Application Publication No. 2009-126355, the spring reception part arranged on the spring seat member of the regulation mechanism has a similar shape as that of the cup seal holding part. This makes it difficult for an assembler to recognize right orientation of those parts when assembling, leading to potential misassemby. Further, it is also difficult to detect the misassembly after the assembly.

Still further, in the cylinder device according to Japanese Patent Application Publication No. 2009-126355, the spring seat member is fixed to the rear piston by being pressed by a stepped part formed on the bolt. Therefore, for example, in a case where coupling strength of the bolt is intended to be improved by increasing axial force, the spring seat member may be deformed by the pushing bolt, making it difficult to secure sufficient coupling.

The present invention provides a cylinder device and a vehicle brake system that allow for easily recognizing assembling orientation of a spring seat member to prevent misassembly, and allow for detecting the misassembly after the spring seat member has been assembled.

Further, the present invention provides a cylinder device and a vehicle brake system that additionally allow for improving coupling strength of a bolt without affecting a spring seat member.

The cylinder device of the present invention is invented to solve the above problems and includes: a front piston that is arranged on a front side at a bottom side of a bottomed cylinder hole; a rear piston that is arranged on a rear side of the cylinder hole; and a regulation mechanism that is arranged between the front piston and the rear piston to regulate separation distance between the front piston and the rear piston, wherein the regulation mechanism includes a retainer that is attached to the front piston, a bolt that has its head engaged with the retainer and is screwed in a screw hole formed in the rear piston, a spring seat member that is installed on the rear piston, and a spring that is compressively arranged between the retainer and the spring seat member, wherein the spring seat member includes a spring reception part that projects toward the retainer to receive a rear end of the spring, a cup seal holding part that projects to an opposite side of the spring reception part to hold a cup seal arranged on the rear piston, and a projection part that projects toward the opposite side from the retainer, and wherein the projection part becomes abuttable on the retainer by a stroke of the rear piston if the spring reception part and the cup seal holding part are installed reversely-oriented on the rear piston.

According to the cylinder device, since the projection part of the spring seat member in the regulation mechanism allows for confirming an assembly orientation, the assembly orientation can be easily recognized for the spring seat member. Therefore, misassembly can be suitably prevented. Further, after the assembling, whether the spring seat member has been misassembled can be easily detected with a stroke of the rear piston by measuring whether a stroke amount is changed because of the projection part abutting on the retainer (whether the projection part abuts on the retainer).

Further, the spring seat member may include an insertion hole through which the bolt is inserted, and the projection part may be formed by folding back an opening edge of the insertion hole. With this structure, the projection part can be easily formed and can be projected in a circular (cylindrical) shape.

Still further, an enlarged diameter part may be formed in an opening of the screw hole for inserting the projection part. With this structure, the projection part also works for positioning the spring seat member when assembling the member, allowing for improving assemblability of the member.

Yet further, it is preferable that the bolt may be inserted in the insertion hole of the spring seat member via clearance and fastened in the screw hole, to press to contact on a bottom of the screw hole. With this structure, the insertion end of the bolt is pressed to contact on the bottom of the screw hole to fix the bolt to the rear piston in a compression-axis direction. This allows for suitably obtaining axial force of the bolt in the compression-axis direction without affecting the spring seat member (without receiving the axial force of the bolt by the spring seat member). Thus, coupling strength of the bolt can be enhanced, while avoiding deformation of the spring seat member. Also, the projection part can suitably be arranged in the screw hole. It is noted that "the axial force of the bolt in the compression-axis direction" indicates pressing force in the axial direction for pressing and fixing the bolt to the rear piston.

In addition, the screw hole may preferably include a female screw part that is formed on an opening side and a straight part that is formed on a bottom side continuously from the female screw part, and the bolt may preferably include a male screw part that is screwed with the female screw part and an end part that is formed continuously from an end of the male screw part to be inserted in the straight part. With this structure, the axial force in the compression-axis direction can be obtained more stably at the bottom side of the screw hole than at a screwing part between the male screw part and the female screw part. Therefore, stable coupling strength can be maintained.

Moreover, a vehicle brake system of the present invention includes the cylinder device described above, wherein the cylinder device is a slave cylinder device that activates an electric actuator to generate hydraulic pressure, and further includes a brake hydraulic pressure generator that generates the hydraulic pressure in response to an input from a driver and a hydraulic pressure controller that performs brake control using the brake hydraulic pressure outputted from the slave cylinder device. The present invention can preferably be used for the slave cylinder device in the vehicle brake system described above.

According to the present invention, a cylinder device and a vehicle brake system can be obtained that allows for easily recognizing orientation of a spring seat member at the time of assembling to prevent misassembly and that allows for detecting the misassembly after the assembling.

Further, according to the present invention, a cylinder device and a vehicle brake system can be obtained that can improve coupling strength of a bolt without affecting a spring seat member.

DETAILED DESCRIPTION OF THE PREFERRED EMBODIMENTS

Hereinbelow, an embodiment of the present invention will be described in detail with reference to the accompanying drawings. In the present embodiment, a description will be given of an example in which a cylinder device of the present invention is applied to a slave cylinder device A2 of a vehicle brake system A in FIG. 1.

Figure 1:
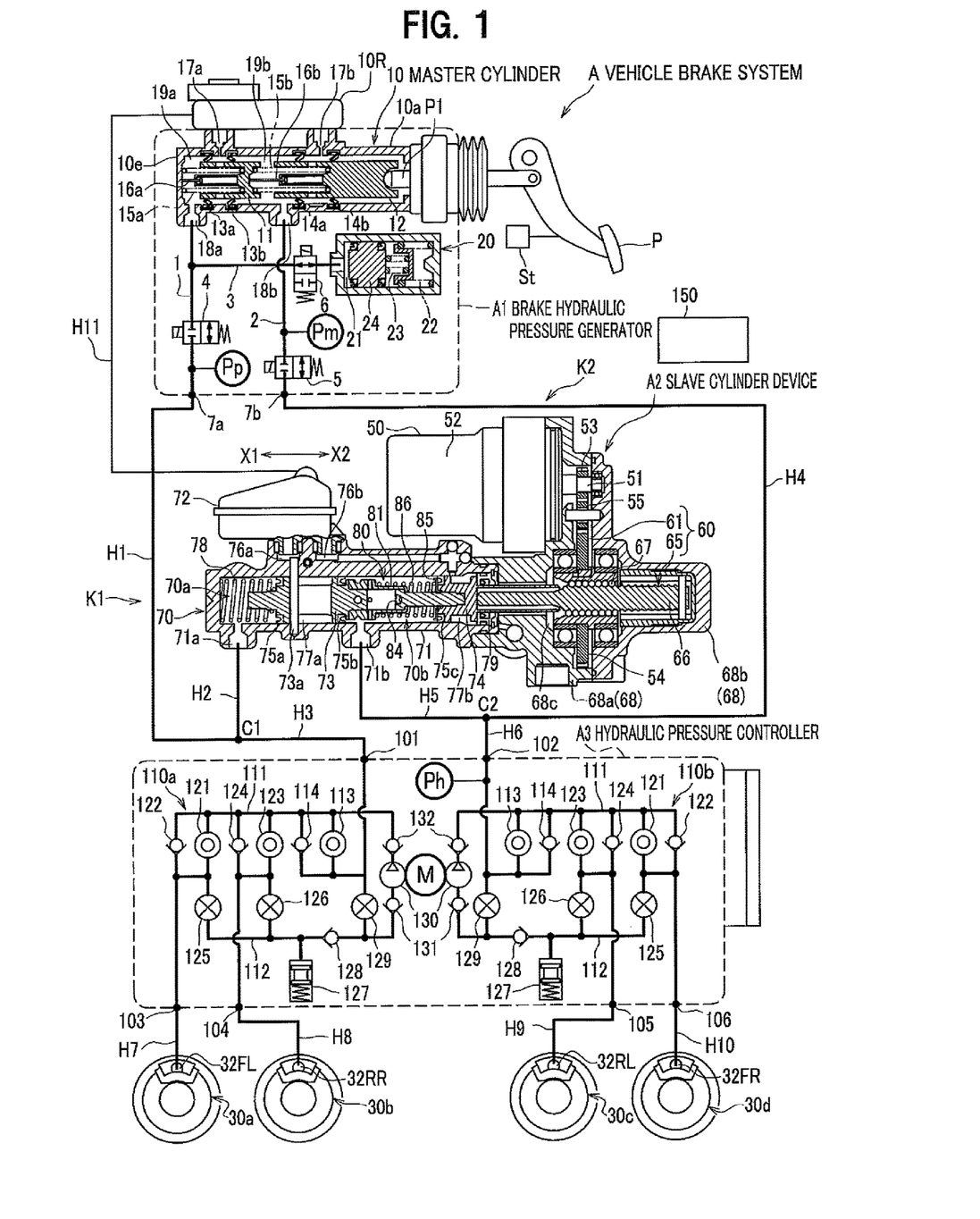
FIG. 1 is a schematic diagram of configuration of a vehicle brake system assembled with a cylinder device according to an embodiment of the present invention.

As shown in FIG. 1, the vehicle brake system A is configured to have a by-wire brake system, for normal operation, in which electric signals are transmitted to activate a brake and a conventional hydraulic-pressure brake system, for fail-safe operation, in which hydraulic pressure (brake hydraulic pressure) is transmitted to activate the brake.

The vehicle brake system A includes: a brake hydraulic pressure generator A1 that generates brake hydraulic pressure in response to control input on a brake pedal P (brake operating element); a slave cylinder device A2 that generates the brake hydraulic pressure by the use of an electric motor 50; and a hydraulic pressure controller A3 that supports stability of vehicle behavior. The pressure generator A1, the slave cylinder device A2 and the hydraulic pressure controller A3 are configured as separate units and are connected to one another, for example, by pipelines (hydraulic pressure lines) formed by pipe material such as hoses and tubes. As the by-wire brake system, the brake hydraulic pressure generator A1 and the slave cylinder device A2 are electrically connected by a harness (not shown). It is noted that some of these devices may be combined into a unit as appropriate.

The vehicle brake system A can be installed in a car such as a hybrid car using a motor together with an engine and an electric car/a fuel-cell car having only a motor as a power source, in addition to a car having only an engine (internal combustion engine) as a power source. Further, the vehicle brake system A can be installed in a car having any drive system such as front-wheel drive, rear-wheel drive, four-wheel drive, without being limited to a specific drive system.

First of all, an outline of the hydraulic pressure lines will be described. As shown in FIG. 1, with reference to one coupling point C1 located slightly below the center, a connection port 7a of the brake hydraulic pressure generator A1 is connected to the coupling point C1 by a first piping tube H1. An output port 71a of the slave cylinder device A2 is connected to the coupling point C1 by a second piping tube H2, and an inlet port 101 of the hydraulic pressure controller A3 is connected to the coupling point C1 by a third piping tube H3.

Further, with reference to the other coupling point C2, the other connection port 7b of the brake hydraulic pressure generator A1 is connected to the coupling point C2 by a fourth piping tube H4. The other output port 71b of the slave cylinder device A2 is connected to the coupling point C2 by a fifth piping tube H5, and the other inlet port 102 of the hydraulic pressure controller A3 is connected to the coupling point C2 by a sixth piping tube H6.

The hydraulic pressure controller A3 includes a plurality of outlet ports 103 to 106. The first outlet port 103 is connected by a seventh piping tube H7 to a wheel cylinder 32FL of a disk brake mechanism 30a arranged on a front left wheel. The second inlet port 104 is connected by an eighth piping tube H8 to a wheel cylinder 32RR of a disk brake mechanism 30b arranged on a rear right wheel. The third outlet port 105 is connected by a ninth piping tube H9 to a wheel cylinder 32RL of a disk brake mechanism 30c arranged on a rear left wheel. The fourth outlet port 106 is connected by a tenth piping tube H10 to a wheel cylinder 32FR of a disk brake mechanism 30d arranged on a front right wheel.

Brake fluid is supplied to the respective wheel cylinders 32FL, 32RR, 32RL and 32FR of the disk brake mechanisms 30a to 30d via the piping tubes H7 to H10 connected to the respective outlet ports 103 to 106. The brake hydraulic pressure in each cylinder is increased to activate each cylinder. Thus, braking force is applied to associated wheels (front left wheel, rear right wheel, rear left wheel and front right wheel).

The brake hydraulic pressure generator A1 includes a tandem master cylinder 10 capable of generating the brake hydraulic pressure via operation on a brake pedal P by a driver, and a reservoir (first reservoir 10R) attached to the master cylinder 10. In a cylinder tube 10a of the master cylinder 10, two pistons (primary piston 11, secondary piston 12) are slidably arranged which are apart from each other at a predetermined distance along an axial direction of the cylinder tube 10a. The primary piston 11 is arranged farther away from the brake pedal P than the secondary piston 12. The secondary piston 12 is arranged in proximity to the brake pedal P to be coupled with the brake pedal P via a push rod P1.

Further, on an inner wall of the cylinder tube 10a, a pair of ring-shaped cup seals 13a, 13b are arranged to slidingly contact with an outer circumferential surface of the primary piston 11 and a pair of ring-shaped cup seals 14a, 14b are arranged to slidingly contact with an outer circumferential surface of the secondary piston 12. Still further, a spring member 15a is arranged between the primary piston 11 and a bottom wall 10e of the cylinder tube 10a. Yet further, a spring member 15b is arranged between the primary piston 11 and the secondary piston 12.

A guide rod 16a is extended from the bottom wall 10e of the cylinder tube 10a along a sliding direction of the primary piston 11. The primary piston 11 is guided by the guide rod 16a to slide.

Further, a guide rod 16b is extended from one end of the primary piston 11, which is closer to the secondary piston 12 than the other, along a sliding direction of the secondary piston 12, so that the secondary piston 12 is guided by the guide rod 16b to slide.

Thus, the primary piston 11 is arranged in series with the secondary piston 12, being coupled by the guide rod 16b.

The cylinder tube 10a is provided with two relief ports 17a, 17b and two output ports 18a, 18b. The cup seals 13a, 13b for the primary piston 11 are arranged so as to have the relief port 17a therebetween. Similarly, the cup seals 14a, 14b for the secondary piston 12 are arranged so as to have the relief port 17b therebetween.

In addition, the cylinder tube 10a includes a first pressure chamber 19a and a second pressure chamber 19b which generate hydraulic pressure corresponding to tread force on the brake pedal P by a driver. The first pressure chamber 19a is arranged to communicate with the connection port 7a via a first hydraulic pressure line 1. The second pressure chamber 19b is arranged to communicate with the connection port 7b via a second hydraulic pressure line 2.

The first pressure chamber 19a is delimited by the cup seal 13a and the bottom wall 10e, and the second pressure chamber 19b is delimited by the cup seal 13b and the cup seal 14a.

The first pressure chamber 19a is configured to generate hydraulic pressure according to displacement of the primary piston 11, and the second pressure chamber 19b is configured to generate hydraulic pressure according to displacement of the secondary piston 12.

Further, the primary piston 11 is displaced based on hydraulic pressure generated in the second pressure chamber 19b by the displacement of the secondary piston 12. That is, the primary piston 11 is displaced to react to the secondary piston 12. The secondary piston 12 is coupled with the brake pedal P via the push rod P1 to displace in the cylinder tube 10a according to operation of the brake pedal P.

A first shutoff valve 4 is made of a normally-open solenoid valve and is arranged upstream of the first hydraulic pressure line 1. Further, a pressure sensor Pp is arranged downstream of the first hydraulic pressure line 1. The pressure sensor Pp measures hydraulic pressure at the downstream including the wheel cylinders 32FL, 32RR, 32RL and 32FR located lower than the first shutoff valve 4 on the first hydraulic pressure line 1.

A second shutoff valve 5 is made of a normally-open solenoid valve and is arranged between the master cylinder 10 and the connection port 7b on a downstream of the second hydraulic line 2. A pressure sensor Pm is arranged upstream of the second hydraulic pressure line 2. The pressure sensor Pm measures hydraulic pressure at upstream including the master cylinder 10 located upper than the second shutoff valve 5 on the second hydraulic pressure line 2.

It is noted that the "normally-open" of the first and second shutoff valves 4, 5 indicates a valve configured to have a normal position (position of a valve body when current is not supplied) being in an open position (normally open). It is noted that, in FIG. 1, the first and second shutoff valves 4, 5 show closed states in which respective solenoids are supplied with current to activate the valve bodies (not shown).

The first hydraulic pressure line 1 is provided with a branch hydraulic pressure line 3 branched from the first hydraulic pressure line 1 at a point between the master cylinder 10 and the first shutoff valve 4. The branch hydraulic pressure line 3 is connected with a third shutoff valve 6 made of a normally-closed solenoid valve and a stroke simulator 20 in series. The "normally-closed" of the third shutoff valve 6 indicates a valve configured to have a normal position (position of the valve body when current is not supplied) being in a closed position (normally closed). It is noted that, in FIG. 1, the third shutoff valve 6 shows an open state in which the solenoid is supplied with current to activate the valve body (not shown).

The stroke simulator 20 gives, at the time of by-wire braking, a stroke and reaction force is response to tread operation on the brake pedal P to simulate generating braking force. The stroke simulator 20 is connected via the branch hydraulic pressure line 3 to the first hydraulic pressure line 1, being closer to the master cylinder 10 than the first shutoff valve 4. A hydraulic pressure chamber 21 communicating with the branch hydraulic pressure line 3 is arranged in the stroke simulator 20. The brake fluid flown from the first pressure chamber 19a of the master cylinder 10 is absorbed via the hydraulic pressure chamber 21.

Further, the stroke simulator 20 includes a first return spring 22 having relatively high spring constant, a second return spring 23 having relatively low spring constant arranged in series with the first return spring 22, and a simulator piston 24 energized by the first and second return springs 22, 23. With these members, gradient increase of pedal reaction force is set to be low at a first-half tread period on the brake pedal P and is set to be high at a latter tread period. Thus, pedal feeling on the brake pedal P is set to be equivalent to pedal feeling when the pedal P is treaded to activate the existing master cylinder 10.

That is, the stroke simulator 20 is configured to generate the reaction force according to the hydraulic pressure of the brake fluid flown from the first pressure chamber 19a so as to give the reaction force to the brake pedal P via the master cylinder 10.

The hydraulic pressure lines in the vehicle brake system A are roughly classified as: a first hydraulic pressure system K1 connecting the first pressure chamber 19a of the master cylinder 10 to the plurality of wheel cylinders 32FL, 32RR; and a second hydraulic pressure system K2 connecting the second pressure chamber 19b of the master cylinder 10 to the plurality of wheel cylinders 32RL, 32FR.

The first hydraulic pressure system K1 includes: the first hydraulic pressure line 1 connecting the output port 18a of the master cylinder 10 (cylinder tube 10a) to the connection port 7a in the brake hydraulic pressure generator A1; the piping tubes H1, H2 connecting the connection port 7a of the brake hydraulic pressure generator A1 to the output port 71a of the slave cylinder device A2; the piping tubes H2, H3 connecting the output port 71a of the slave cylinder device A2 to the inlet port 101 of the hydraulic pressure controller A3; and the piping tubes H7, H8 connecting the outlet ports 103, 104 of the hydraulic pressure controller A3 to each wheel cylinder 32FL, 32RR, respectively.

The second hydraulic pressure system K2 includes: the second hydraulic pressure line 2 connecting the output port 18b of the master cylinder 10 (cylinder tube 10a) to the connection port 7b in the brake hydraulic pressure generator A1; the piping tubes H4, H5 connecting the connection port 7b of the brake hydraulic pressure generator A1 and the output port 71b of the slave cylinder device A2; the piping tubes H5, H6 connecting the output port 71b of the slave cylinder device A2 and the inlet port 102 of the hydraulic pressure controller A3; and the piping tubes H9, H10 connecting the outlet ports 105, 106 of the hydraulic pressure controller A3 to each wheel cylinder 32RL, 32FR, respectively.

The slave cylinder device A2 includes the electric motor 50, an actuator mechanism 60 and a cylinder mechanism 70 energized by the actuator mechanism 60.

The actuator mechanism 60 includes a gear mechanism (speed reduction mechanism) 61 arranged on a side of an output shaft 51 in which a plurality of gears are engaged to transmit rotational drive force of the electric motor 50, and a ball screw structure 65. The ball screw structure 65 includes a ball screw shaft 66 that moves back and force along an axis direction by the rotational drive force transmitted via the gear mechanism 61, and balls 67.

In the present embodiment, the ball screw structure 65 is accommodated, together with the gear mechanism 61, in a mechanism accommodation part 68c of an actuator housing 68.

The cylinder mechanism 70 includes a cylinder main body 71 approximately in a shape of cylinder and a second reservoir 72 attached to the cylinder main body 71. The second reservoir 72 is connected to the first reservoir 10R attached to the master cylinder 10 of the brake hydraulic pressure generator A1 by a piping tube H11 so as to be supplied with the brake fluid stored in the first reservoir 20 via the piping tube H11. It is noted that a tank that stores the brake fluid may be arranged on the piping tube H11.

An open end of the approximately cylinder-shaped cylinder main body 71 is engaged with the actuator housing 68 having a housing main body 68a and a housing cover 68b to couple the cylinder main body 71 with the actuator housing 68 for forming the slave cylinder device A2.

Figure 2:
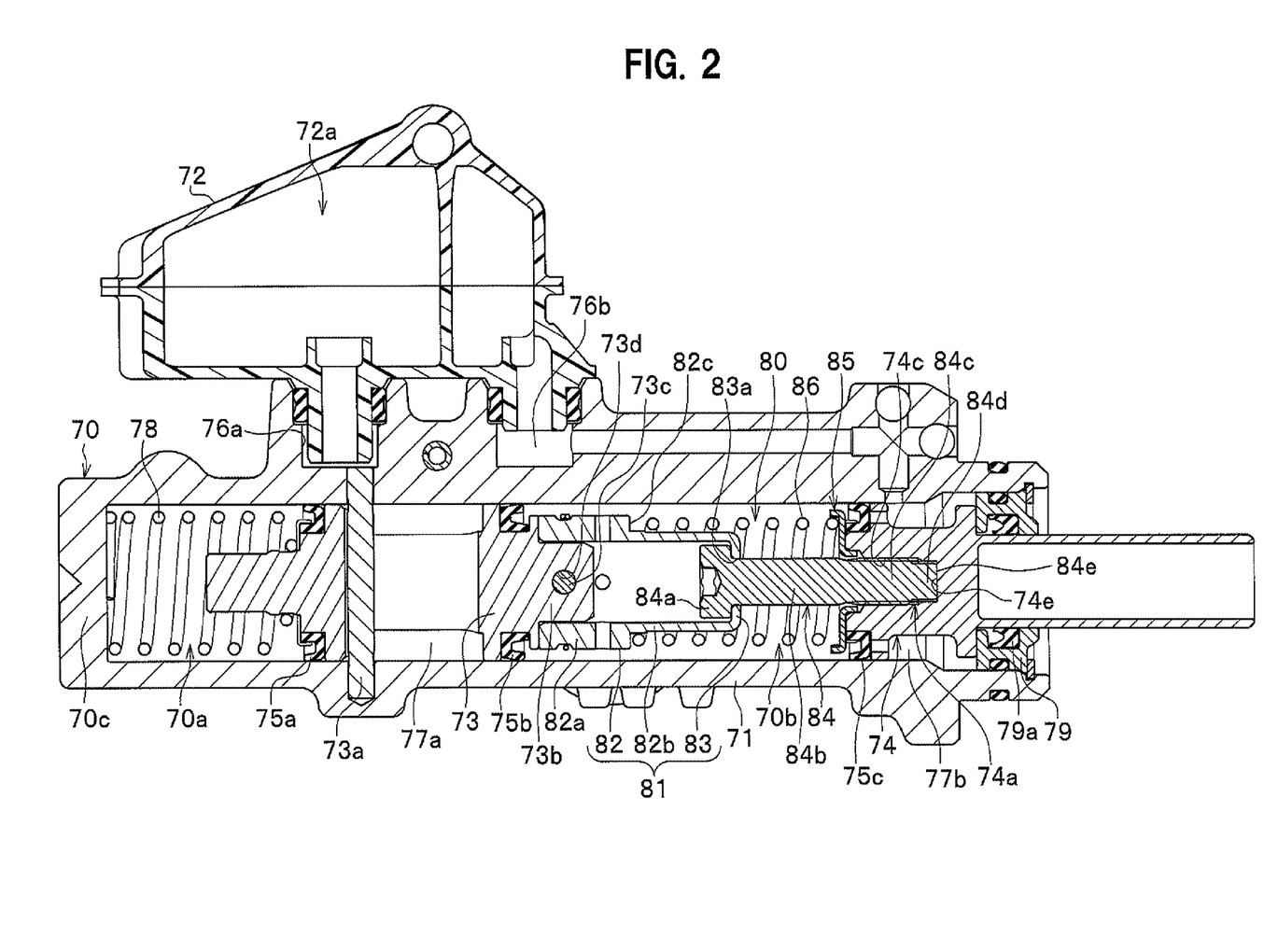
FIG. 2 is a cross sectional view showing main parts of a slave cylinder device included in the vehicle brake system in FIG. 1.

The slave cylinder device A2 includes a first slave piston 73 as a front piston arranged in the cylinder main body 71, a second slave piston 74 as a rear piston and a regulation mechanism 80. The regulation mechanism 80 regulates the maximum stroke (maximum displacement distance) and the minimum stroke (minimum displacement distance) of the first slave piston 73 and the second slave piston 74. Details of the regulation mechanism 80 will be described later.

The first slave piston 73 is arranged farther away from the ball screw structure 65 than the second slave piston 74. Further, the second slave piston 74 is arranged in proximity to the ball screw structure 65 and abuts on one end of the ball screw shaft 66 to displace together with the ball screw shaft 66 in an X1 direction (frontward) or an X2 direction (rearward).

Further, the electric motor 50 in the present embodiment is configured so as to be covered by a motor casing 52 formed separately from the cylinder main body 71, and is arranged such that the output shaft 51 is approximately in parallel with a sliding direction (axis direction) of the first and second slave pistons 73, 74.

The electric motor 50 is also configured so that the rotational drive force of the output shaft 51 is transmitted to the ball screw structure 65 via the gear mechanism 61.

The gear mechanism 61 is formed by three gears, for example, a first gear 53 that is attached to the output shaft 51 of the electric motor 50, a third gear 54 that rotates the balls 67, which moves the ball screw shaft 66 back and forth in the axis direction, around an axis of the ball screw shaft 66, and a second gear 55 that transmits the rotation of the first gear 53 to the third gear 54. The third gear 54 rotates around the axis of the ball screw shaft 66.

The actuator mechanism 60 in the present embodiment converts, by the structure described above, the rotational drive force of the output shaft 51 of the electric motor 50 into back-and-forth drive force (linear drive force) of the ball screw shaft 66.

A pair of slave cup seals 75a, 75b are respectively installed on an outer circumferential surface of the first slave piston 73 via an annular stepped part. A first back chamber 77a communicating with a reservoir port 76a described later is formed between the pair of slave cup seals 75a, 75b.

It is noted that a first return spring 78 is arranged between the first slave piston 73 and a side end of the cylinder main body 71. Further, a spring 86 constituting the regulation mechanism 80 is arranged between the first slave piston 73 and the second slave piston 74.

Further, an annular guide piston 79 is arranged between an outer circumferential surface of the second slave piston 74 and the mechanism accommodation part 68c. The guide piston 79 liquid-tightly seals space between the second slave piston 74 and the mechanism accommodation part 68c as well as guides the second slave piston 74 movably in the axis direction thereof. The guide piston 79 is arranged as a seal member at a rear of the second slave piston 74 to close the cylinder main body 71. A slave cup seal 79a is installed on an inner circumferential surface of the guide piston 79 to liquid-tightly seal space between the second slave piston 74 and the guide piston 79. Still further, a slave cup seal 75c is installed on the outer circumferential surface at a front of the second slave piston 74 via an annular stepped part.

With this structure, the brake fluid to be filled in the cylinder main body 71 is enclosed in the cylinder main body 71 by the guide piston 79 so as not to allow the brake fluid to flow in the actuator housing 68. It is noted that a second back chamber 77b communicating with a reservoir port 76b described later is formed between the guide piston 79 and the slave cup seal 75c.

The two reservoir ports 76a, 76b and the two output ports 71a, 71b (not shown in FIG. 2) are arranged in the cylinder main body 71. In this case, the reservoir port 76a (76b) is arranged to communicate with a reservoir chamber 72a (see FIG. 2) in the second reservoir 72.

Further, a first hydraulic pressure chamber 70a and a second hydraulic pressure chamber 70b are arranged in the cylinder main body 71, the first hydraulic pressure chamber 70a controlling brake hydraulic pressure to be outputted from the output port 71a to the wheel cylinders 32FL, 32RR, and the second hydraulic pressure chamber 70*b* controlling brake hydraulic pressure to be outputted from the other output port 71*b* to the wheel cylinders 32RL, 32FR.

With this structure, the first back chamber 77*a*, the second back chamber 77*b*, the first hydraulic pressure chamber 70*a* and the second hydraulic pressure chamber 70*b* enclosing the brake fluid forms an enclosing part for the brake fluid in the cylinder main body 71, and the enclosing part is liquid-tightly (air-tightly) delimited from the mechanical accommodation part 68*c* of the actuator housing 68 by the guide piston 79 functioning as a seal member.

It is noted that the way to attach the guide piston 79 to the cylinder main body 71 is not limited and a snap ring (not shown) may be used for the attachment.

Further, a stopper pin 73*a* is arranged in the first slave piston 73 which regulates a sliding range of the first slave piston 73 to prevent the first slave piston 73 from returning toward the second slave piston 74 excessively. With this structure, especially in a fail-safe operation when the master cylinder 10 is used for braking, one system can be prevented from being broken even if the other system has been broken.

The hydraulic pressure controller A3 is formed by well-known members and includes a first brake system 110*a* and a second brake system 110*b*. The first brake system 110*a* controls the first hydraulic pressure system K1 connected to the disk brake mechanisms 30*a*, 30*b* (wheel cylinders 32FL, 32RR) of the front left wheel and rear right wheel. The second brake system 110*b* controls the second hydraulic pressure system K2 connected to the disk brake mechanisms 30*c*, 30*d* (wheel cylinders 32RL, 32FR) of the rear left wheel and front right wheel.

The first and second brake systems 110*a*, 110*b* have the same structure with each other. Therefore, the corresponding elements in respective systems are given the same reference numerals. The first brake system 110*a* will be mainly described and the second brake system 110*b* will be described in parentheses.

The first brake system 110*a* (second brake system 110*b*) has pipelines (first common hydraulic pressure line 111 and second common hydraulic pressure line 112) in common for the wheel cylinders 32FL, 32RR (32RL, 32FR). The hydraulic pressure controller A3 includes a regulator valve 113, a first check valve 114, a first inlet valve 121, a second check valve 122, a second inlet valve 123, a third check valve 124, a first outlet valve 125, a second outlet valve 126, a reservoir 127, a fourth check valve 128, a pump 130, a motor M and a suction valve 129.

The regulator valve 113 is made of a normally-open solenoid valve which is arranged between the inlet port 101 (102) and the first common hydraulic pressure line 111. The first check valve 114 is arranged in parallel with the regulator valve 113, allowing the brake fluid to flow from the inlet port 101 (102) to the first common hydraulic pressure line 111, or disallowing the brake fluid to flow from the first common hydraulic pressure line 111 to the inlet port 101 (102). The first inlet valve 121 is made of a normally-open solenoid valve which is arranged between the first common hydraulic pressure line 111 and the first outlet port 103 (fourth outlet port 106). The second check valve 122 is arranged in parallel with the first inlet valve 121, allowing the brake fluid to flow from the first outlet port 103 (fourth outlet port 106) to the first common hydraulic pressure line 111, or disallowing the brake fluid to flow from the first common hydraulic pressure line 111 to the first outlet port 103 (fourth outlet port 106). The second inlet valve 123 is made of a normally-open solenoid valve which is arranged between the first common hydraulic pressure line 111 and the second outlet port 104 (third outlet port 105). The third check valve 124 is arranged in parallel with the second inlet valve 123, allowing the brake fluid to flow from the second outlet port 104 (third outlet port 105) to the first common hydraulic pressure line 111, or disallowing the brake fluid to flow from the first common hydraulic pressure line 111 to the second outlet port 104 (third outlet port 105).

The first outlet valve 125 is made of a normally-closed solenoid valve which is arranged between the first outlet port 103 (fourth outlet port 106) and the second common hydraulic pressure line 112. The second outlet valve 126 is made of a normally-closed solenoid valve which is arranged between the second outlet port 104 (third outlet port 105) and the second common hydraulic pressure line 112. The reservoir 127 is connected to the second common hydraulic pressure line 112. The fourth check valve 128 is arranged between the first common hydraulic pressure line 111 and the second common hydraulic pressure line 112, allowing the brake fluid to flow from the second common hydraulic pressure line 112 to the first common hydraulic pressure line 111, or disallowing the brake fluid to flow from the first common hydraulic pressure line 111 to the second common hydraulic pressure line 112. The pump 130 is arranged between the fourth check valve 128 and the first common hydraulic pressure line 111 to supply the brake fluid from the second common hydraulic pressure line 112 to the first common hydraulic pressure line 111. A suction valve 131 and a discharge valve 132 are directly connected to a front and a rear of the pump 130, respectively. A motor M drives the pump 130. The suction valve 129 is made of a normally-closed solenoid valve which is arranged between the second common hydraulic pressure line 112 and the inlet port 101 (102).

It is noted that, in the second brake system 110*b*, a pressure sensor Ph is arranged on a pipeline (hydraulic pressure line) adjacent to the introduction port 102. The pressure sensor Ph measures the brake hydraulic pressure that is controlled by the second hydraulic pressure chamber 70*b* of the slave cylinder device A2 and is outputted from the output port 71*b* of the slave cylinder device A2. The measured signals measured by each of the pressure sensors Pm, Pp and Ph are sent to the controller 150. Further, the hydraulic pressure controller A3 can perform ABS control (anti-lock brake control) besides vehicle behavior control.

Still further, an ABS device having an ABS control function only may be employed in place of the hydraulic pressure control device A3 of the present embodiment.

The vehicle brake system A according to the present embodiment is essentially configured as described above, and advantageous effects thereof will be described below.

At a normal condition when the vehicle brake system A functions normally, the first shutoff valve 4 and the second shutoff valve 5 are energized to be in the closed state, whereas a third shutoff valve 6 made of a normally-closed solenoid valve is energized to be in an open state. Since the first and second hydraulic pressure systems K1 and K2 are shut off, the hydraulic pressure generated in the master cylinder 10 of the brake hydraulic pressure generator A1 is not transmitted to the wheel cylinders 32FL, 32RR, 32RL and 32FR of the disk brake mechanisms 30*a* to 30*d*.

Then, the hydraulic pressure generated in the first pressure chamber 19*a* of the master cylinder 10 is transmitted to the hydraulic pressure chamber 21 of the stroke simulator 20 via the branch hydraulic pressure line 3 and the third shutoff valve 6 in the open state. The hydraulic pressure transmitted to the hydraulic pressure chamber 21 displaces the simulator piston 24 against spring force of the first and second return springs 22, 23, which allows for a stroke of the brake pedal P and pseudo-pedal reaction force is generated to be applied to the brake pedal P. Consequently, a driver can have brake feeling without discomfort.

In such a system, upon detecting a tread on the brake pedal P by the driver, the controller 150 activates the electric motor 50 of the slave cylinder device A2 to energize the actuator mechanism 60, to displace the first and second slave pistons 73, 74 toward an X1 direction (forward direction) against the spring force of the first return spring 78 and the spring 86. This displacement causes the brake fluid in the first and second hydraulic pressure chambers 70a and 70b to be pressurized in balance, and desired brake hydraulic pressure is generated.

Specifically, the controller 150 calculates tread control input on the brake pedal P according to a measured value by a pedal stroke sensor St, sets brake hydraulic pressure (target hydraulic pressure) as a target value based on the tread control input in consideration of regenerative braking force, and urges the slave cylinder device A2 to generate the set brake hydraulic pressure.

Then, the brake hydraulic pressure generated by the slave cylinder device A2 is supplied to the hydraulic pressure controller A3 via the inlet ports 101, 102. That is, the slave cylinder device A2 activates the first and second slave pistons 73 and 74 by the rotational drive force of the electric motor 50 that is driven to rotate by electric signals when the brake pedal P is operated, and generates the brake hydraulic pressure according to the control input on the brake pedal P to supply to the hydraulic pressure controller A3.

Further, the electric signals in the present embodiment are control signals for controlling power for driving the electric motor 50 and for controlling the electric motor 50.

It is noted that, the controller 150 is configured with, for example, a micro computer including a CPU (Central Processing Unit), a ROM (Read Only Memory), a RAM (Random Access Memory) and the like, and peripheral devices (none of these are shown). The controller 150 is configured to execute programs stored in the ROM in advance to control the vehicle brake system A.

The brake hydraulic pressure in the first and second hydraulic pressure chambers 70a and 70b of the slave cylinder device A2 is transmitted to the wheel cylinders 32FL, 32RR, 32RL, 32FR of the disk brake mechanisms 30a to 30d via the first and second inlet valves 121, 123 in the open state of the hydraulic pressure controller A3 to actuate these wheel cylinders for applying the desired braking force to respective wheels.

In other words, in the vehicle brake system A according to the present embodiment, during normal operations when at least the slave cylinder device A2, the controller 150 performing the by-wire control are operable, so-called a brake-by-wire brake system is activated, in which the disk brake mechanisms 30a to 30d are activated by the brake hydraulic pressure generated in the slave cylinder device A2 in a state that the first and second shutoff valves 4 and 5 shut off communication between the master cylinder 10 that generates the hydraulic pressure according to the tread on the brake pedal P by the driver and the disk brake mechanisms 30a to 30d that brake respective wheels. Therefore, the present embodiment can suitably be applied to a vehicle such as an electric car in which negative pressure does not exist due to an internal engine that has conventionally been used.

Further, in an abnormal condition when at least the slave cylinder device A2 is inoperable, a conventional and so-called hydraulic pressure brake system is activated, in which the first and second shutoff valves 4 and 5 are opened and the third shutoff valve 6 is closed, and the hydraulic pressure generated in the master cylinder 10 is transmitted to the disk brake mechanisms 30a to 30d as the brake hydraulic pressure to activate these mechanisms.

For example, a hybrid car or an electric car including a traveling electric motor (traveling motor) may have a regenerative brake that regenerates power with the traveling motor to generate braking force. If regenerative braking is activated in such a vehicle, the controller 150 activates the traveling motor as a generator coupled to at least either one of axles at a front or a rear of the vehicle and causes the regenerative brake to generate braking force (regenerative braking force) according to the braking control input etc, on the brake pedal P, or the like. When the regenerative braking force is not enough for the braking control input on the brake pedal P (braking force requested by the driver), the controller 150 activates the electric motor 50 to generate the braking force with the slave cylinder device A2. That is, the controller 150 performs regenerative and cooperative control using the regenerative braking and the hydraulic pressure braking (slave cylinder device A2). In this case, the controller 150 can be configured to determine an operation amount of the slave cylinder device A2 using a known method.

For example, target hydraulic pressure can be set to braking hydraulic pressure for the slave cylinder device A2 generating braking force calculated by subtracting the regenerative braking force from braking force (total braking force) that is determined according to the braking control input on the brake pedal P, or, the target hydraulic pressure can be set to the braking hydraulic pressure for the slave cylinder device A2 generating braking force in a given ratio to the total braking force. With such a setting, the controller 150 may be configured to determine the operation amount of the slave cylinder device A2.

EMBODIMENT

Next, a description will be given in detail of the regulation mechanism 80 of the cylinder mechanism 70 in the slave cylinder device A2 according to one embodiment of the present invention, referring to FIGS. 2 to 7. It is noted that, in the description below, a bottom 70c (see FIG. 2) of the cylinder main body 71 is refereed as a front side and the open end of the cylinder main body 71 (on the same side as the brake pedal P, see FIG. 1) is referred as a rear side.

The regulation mechanism 80 is interposed between the first slave piston (front piston) 73 and the second slave piston (rear piston) 74. The regulation mechanism 80 regulates, as described above, the maximum stroke (maximum displacement distance) and the minimum stroke (minimum displacement distance) of the first slave piston 73 and the second slave piston 74.

The regulation mechanism 80 includes a retainer 81, a bolt 84, a spring seat member 85 and a spring 86.

The retainer 81 has a bottomed cylindrical shape and includes a cylindrical body 82 and a bottom 83, as shown in FIG. 2. The cylindrical body 82 includes a thick part 82a and a thin part 82b that is continuous to the thick part 82a. The thick part 82a and thin part 82b have the same inner diameter. The thick part 82a is externally fitted onto a shaft part 73b in a cylindrical shape formed at a rear of the first slave piston 73. An insertion hole 73d through which a coupling pin 73c is inserted is formed in the shaft part 73b of the first slave piston 73, and a coupling hole (not shown) is formed in the thick part 82a through which the coupling pin 73c is inserted. The retainer 81 is fixedly coupled with the shaft part 73b by the coupling pin 73c inserted into the insertion hole 73d via the coupling hole. At a boundary between the thick part 82a and the thin part 82b on an outer circumferential surface of the cylindrical body 82, a step surface 82c is formed to receive a front end of the spring 86. The front end of the spring 86 compressively arranged in the cylinder main body 71 abuts on the step surface 82c.

A bolt insertion hole 83a through which a body 84b of the bolt 84 is slidably inserted is formed in the bottom 83. A head 84a of the bolt 84 abuts on an inner surface of the bottom 83.

Figure 4A:
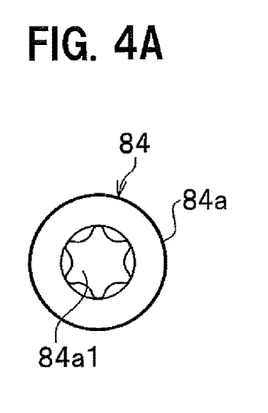
FIG. 4A is a front view of a bolt included in the regulation mechanism.
Figure 4B:
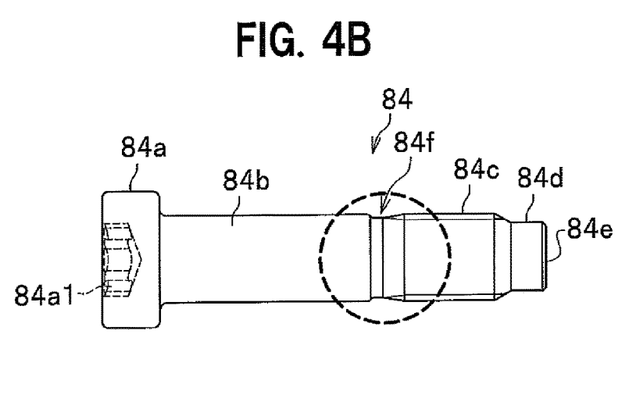
FIG. 4B is a side view of the same and FIG. 4C is a partially enlarged side view of the same.

As shown in FIG. 2, the bolt 84 couples the first slave piston 73 with the second slave piston 74 via the retainer 81, and guides movement of the spring seat member 85 with respect to the retainer 81 (movement of the second slave piston 74 with respect to the first slave piston 73). Further, the bolt 84 regulates the retainer 81 so as not to move further away from the spring seat member 85 (the first slave piston 73 so as not to move further away from the second slave piston 74). As shown in FIG. 4B, the bolt 84 includes the head 84a, the body 84b, a male screw part 84c and an end part 84d. At an front end of the head 84a, a hole 84a1 is formed to fasten the bolt 84 by a wrench (see FIG. 4A). The head 84a is arranged inside the retainer 81 to have a gap between an inner circumferential surface of the retainer 81 and itself such that the head 84a can slidably be moved in the axial direction. The body 84b is slidably (unfixedly) inserted into the insertion hole 83a in the bottom 83 of the retainer 81. The male screw part 84c can be screwed in a screw hole 74a formed at a front end part of the second slave piston 74.

Figure 3:
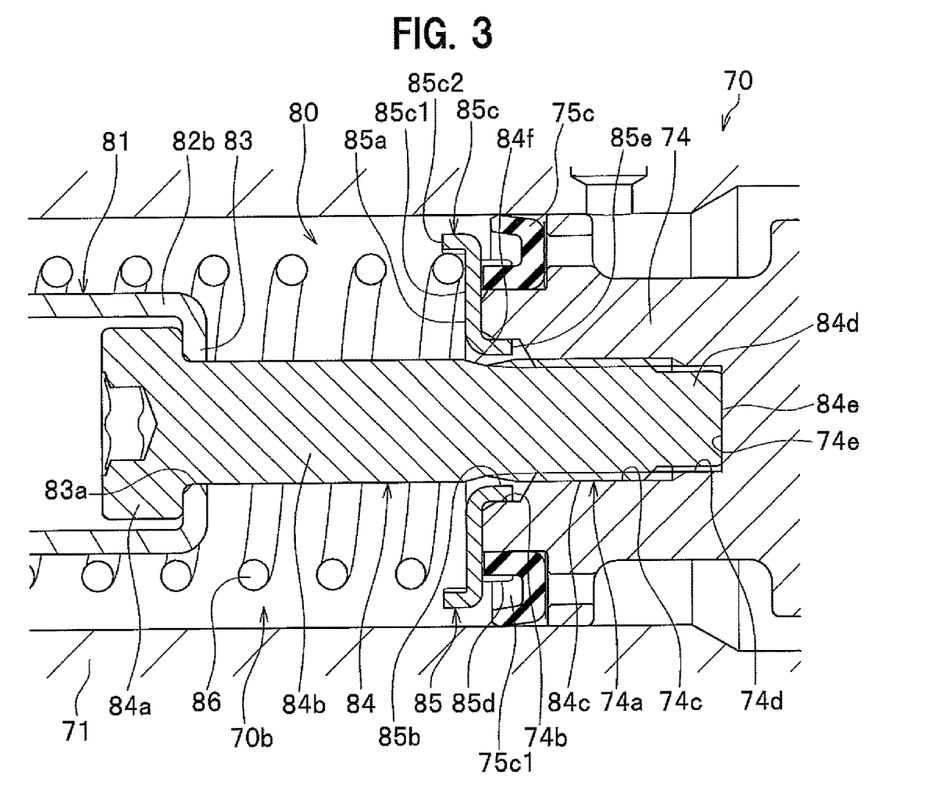
FIG. 3 is an enlarged cross sectional view showing a detailed structure around a spring seat member included in a regulation mechanism.
Figure 4C:
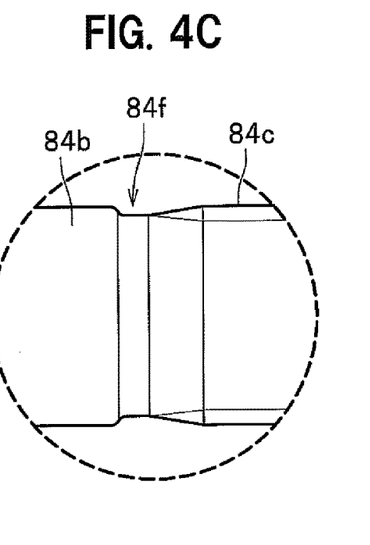

As shown in FIGS. 4B and 4C, an annular recess 84f is formed at the boundary between the body 84b and the male screw part 84c. As shown in FIG. 3, the recess 84f is inserted within a projection part 85e (in an insertion hole 85b) of the spring seat member 85 unfixedly inside an opening of the screw hole 74a.

The end part 84d is formed continuously with the male screw part 84c. The end part 84d is formed to have a smaller diameter than an outer diameter of the screw part 84c (smaller diameter than an inner diameter of the screw hole 74a). An end surface 84e of the end part 84d as an insertion end of the bolt (opposite side from the head) is formed in a planar surface that is perpendicular to the axis of the bolt 84 (perpendicular surface).

On the other hand, as shown in FIG. 3, the screw hole 74a of the second slave piston 74 includes a female screw part 74c screwed with the male screw part 84c of the bolt 84 and a straight part 74d formed continuously with the female screw part 74c. The straight part 74d has a smaller diameter than an inner diameter of the female screw part 74c. The end part 84d of the bolt 84 is inserted into the straight part 74d. A bottom part 74e of the screw hole 74a is formed in a planar surface perpendicular to the axis of the bolt 84 (perpendicular surface). The end surface 84e of the end part 84d of the bolt 84 is pressed to contact on the bottom part 74e by screwing the bolt 84 into the screw hole 74a tightly.

Further, as shown in FIG. 3, an enlarged diameter part 74b is formed which is larger than the inner diameter of the male screw part 74c at the opening of the screw hole 74a. The enlarged diameter part 74b functions as a space where a projection part 85e (described later) of the spring seat member 85 is inserted.

Figure 5A:
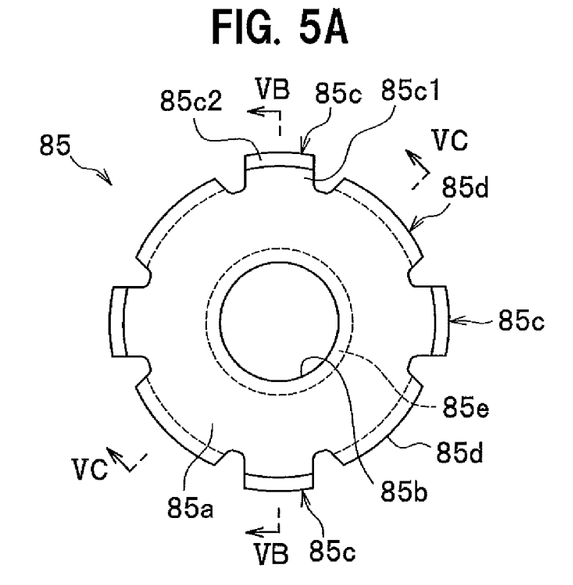
FIG. 5A is a front view of the spring seat member.
Figure 5B:
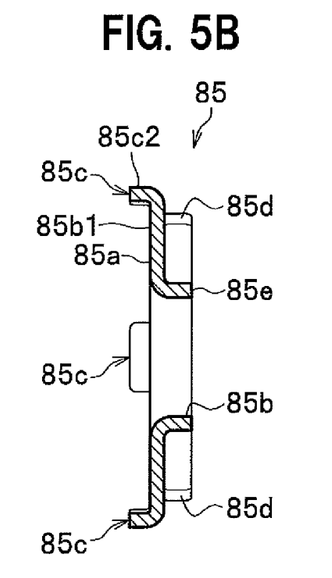
FIG. 5B is a cross sectional view of the same along a VB-VB line in FIG. 5A
Figure 5C:
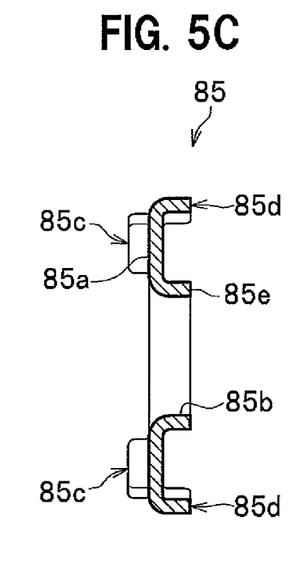
FIG. 5C is a cross sectional view of the same along a VC-VC line in FIG. 5A.
Figure 6A:
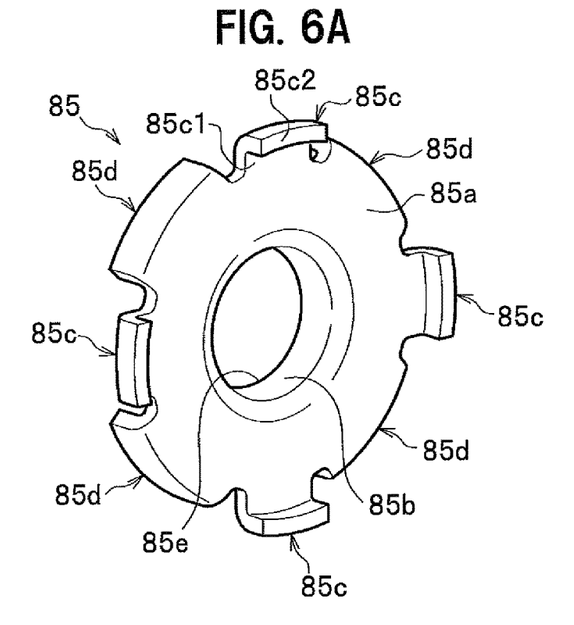
FIG. 6A is a perspective view of the spring seat member seen from obliquely upward at the front and FIG. 6B is a perspective view of the same seen from obliquely upward from the back.
Figure 6B:
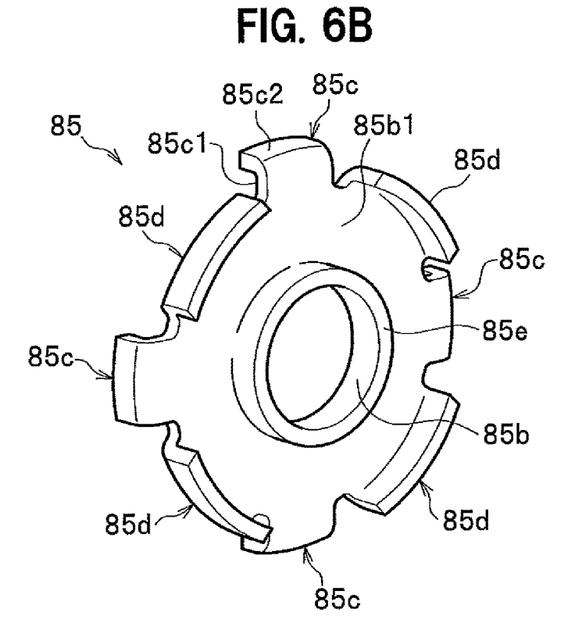

As shown in FIGS. 2 and 3, the spring seat member 85 is arranged on a front end of the second slave piston 74 and has an approximately annular shape (see FIG. 5A). As shown in FIGS. 5A to 5C, 6A and 6B, the spring seat member 85 includes a plate part 85a, an insertion hole 85b, a plurality of (four in total) spring reception parts 85c, a plurality of (four in total) cup seal holding parts 85d and the projection part 85e.

The insertion hole 85b is formed in a circular shape at a center of the plate part 85a. The insertion hole 85b is formed to have an inner diameter larger than outer diameters of the body 84b and the the male screw part 84c of the bolt 84. That is, the insertion hole 85b has a clearance which allows the body 84b and the screw part 84c of the bolt 84 to be inserted.

The spring reception part 85c includes an extended part 85c1 and an outer rib 85c2 continuous to the extended part 85c1. The extended part 85c1 extends from an outer edge of the plate part 85a outward in a radial direction. In the present embodiment, four extended parts 85c1 are arranged at intervals of 90 degrees around a center of the spring seat member 85 in a circumferential direction. A rear end of the spring 86 abuts on the extended parts 85c1.

The outer rib 85c2 extends so as to be bent from an outer end of the extended part 85c1 toward the retainer 81 (see FIG. 2). As shown in FIG. 5A, width of the outer rib 85c2 is set to the same width as that of the extended part 85c1. Distance from the center of the spring seat member 85 to a base end of the outer rib 85c is longer than an outer diameter of a rear end of the spring 86. Thus, the rear end of the spring 86 is suitably kept inside respective outer ribs 85c2.

The cup seal holding part 85d extends so as to be bent from an outer edge of the plate part 85a toward the slave cup seal 75c (opposite side from the retainer 81, see FIG. 3). In the present embodiment, the four cup seal holding parts 85d are arranged at intervals of 90 degrees around the center of the spring seat member 85 in the circumferential direction. Distance from the center of the spring seat member 85 to the cup seal holding part 85d is set to approximately the same distance from a center of the slave cup seal 75c to a groove part 75c1 of the slave cup seal 75c. Thus, the cup seal holding part 85d is formed as as to be inserted in the groove part 75c1. The cup seal holding part 85d is formed to position the slave cup seal 75c so as not to be fallen from a front side (front end of the second slave piston 74).

The spring reception part 85c and the cup seal holding part 85d are arranged alternately around the center of the spring seat member 85. That is, the spring reception part 85c and the cup seal holding part 85d which are adjacent to teach other are arranged at intervals of 45 degrees.

The projection part 85e is formed in a cylindrical shape by folding back an opening edge of the insertion hole 85b to an opposite side from the retainer 81. The projection part 85e is, for example, formed through burring process. The projection part 85e is inserted into the enlarged diameter part 74b of the screw hole 74a in the second slave piston 74 when the spring seat member 85 is placed on the front end of the second slave piston 74. As mentioned above, the clearance is set between the insertion hole 85b and the bolt 84 inside the enlarged diameter part 74b. That is, the bolt 84 does not interfere with the spring seat member 85, and the spring seat member 85 is not fixed to the bolt 84 or the second slave piston 74 by the screwed bolt 84. It is noted that the projection part 85e is arranged to circumferentially face the recess 84f of the bolt 84 in a state that the spring seat member 85 is installed on the front end of the second slave piston 74 and the bolt 84 is tightly screwed in the screw hole 74a. That is, the clearance between the projection part 85e (insertion hole 85b) and the bolt 84 can be securely maintained by arranging the recess 84f inside the projection part 85e.

Figure 7A:
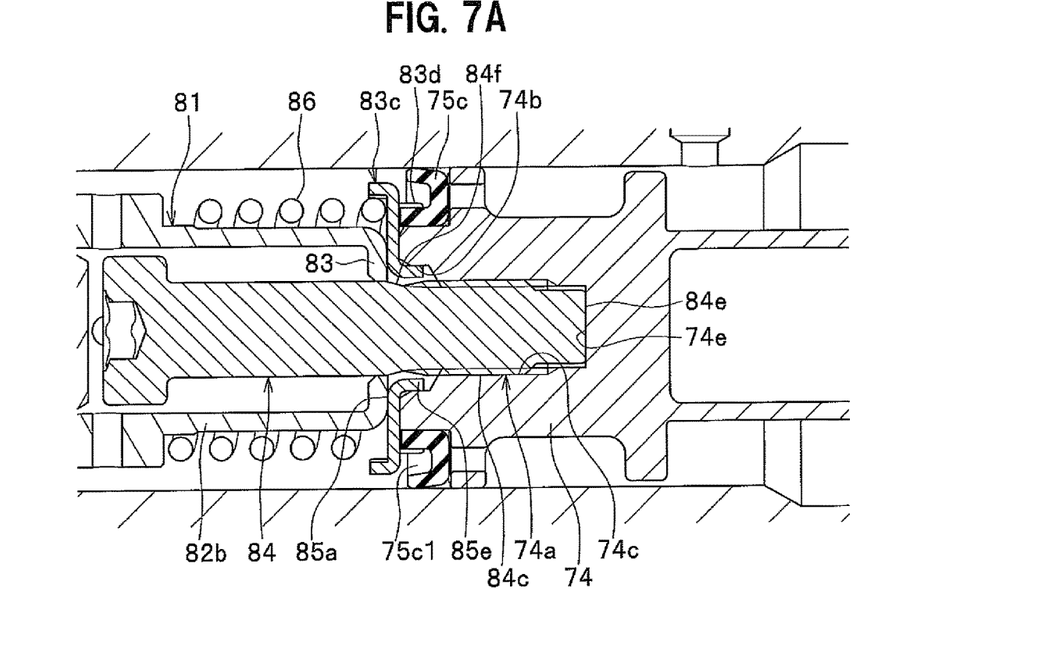
FIG. 7A is a cross sectional view of a second slave piston at the time of stroke showing a case where the spring seat member is normally assembled and FIG. 7B is a cross sectional view of the same showing a case where the spring seat member is reversely assembled.
Figure 7B:
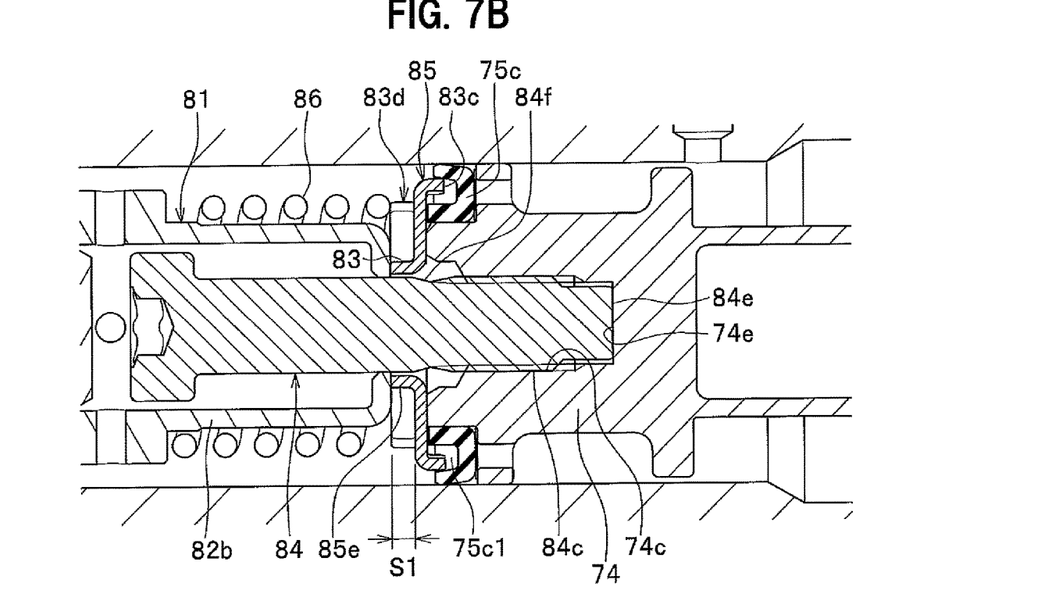

Here, if the spring reception part 85c and the cup seal holding part 85d are assembled in reverse orientation by mistake, the projection part 85e is arranged to face the bottom 83 of the retainer 81 (see FIG. 7B). That is, at stroke of the second slave piston 74, the projection part 85e is positioned to abut on the bottom 83 of the retainer 81.

With the regulation mechanism 80 as described above, when the spring seat member 85 is assembled, the spring seat member 85 is assembled on the front end of the second slave piston 74 after a front/back orientation of the spring seat member 85 is confirmed. That is, an orientation of the projection part 85e formed in the spring seat member 85 is confirmed, the spring seat member 85 is closely brought to the front end of the second slave piston 74 such that the projection part 85e faces the screw hole 74a (front end of the second slave piston 74), and the projection part 85e is inserted in the enlarged diameter part 74b of the screw hole 74a to install the spring seat member 85 on the front end of the second slave piston 74. Then, each cup seal holding part 85d of the spring seat member 85 is inserted in the groove part 75c1 of the slave cup seal 75c to keep the cup seal 75c held by each cup seal holding part 85d.

On the other hand, the spring reception part 85c of the spring seat member 85 is projected toward the retainer 81, allowing the spring reception part 85c to hold the rear end of the spring 86.

Then, the spring 86 is interposed between the spring seat member 85 and the retainer 81, and the bolt 84 is inserted in the bolt insertion hole 83a at the bottom 83 of the retainer 81 to screw in the screw hole 74a of the second slave piston 74. In this case, since the projection part 85e of the spring seat member 85 is inserted in the enlarged diameter part 74b of the screw hole 74a, the projection part 85e (insertion hole 85b) serves as an insertion guide when the bolt 84 is screwed. Thus, the end part 84d of the bolt 84 can be inserted in the screw hole 74a smoothly.

Then, the bolt 84 is screwed in the screw hole 74a with the use of wrench for screwing. In this case, since the end part 84d of the bolt 84 has a smaller diameter than the inner diameter of the female screw part 74c of the screw hole 74a, the end part 84d reaches the straight part 74d of the screw hole 74a passing through inside the female screw part 74c when the bolt 84 is screwed. By fastening the bolt 84, the end surface 84e at the end part 84d of the bolt 84 is pressed to contact on the bottom part 74e of the screw hole 74a to fix the bolt 84 to the second slave piston 74.

It is noted that clamping force of the bolt 84 does not act on the spring seat member 85 since the bolt 84 is inserted in the insertion hole 85b of the spring seat member 85 via the clearance. Therefore, there is no risk that the spring seat member 85 is deformed by screwing the bolt 84.

With the regulation mechanism 80 assembled like this, since the plate part 85a of the spring seat member 85 is arranged to face the bottom 83 of the retainer 81, when the second slave piston 74 is stroked, the plate part 85a of the spring seat member 85 abuts on the bottom part 83 of the retainer 81 as shown in FIG. 7A. That is, the second slave piston 74 can stroke (fully) till the plate part 85a of the spring seat member 85 abuts on the bottom 83 of the retainer 81.

On the contrary, as shown in FIG. 7B, if the spring seat member 85 is misassembled back to front, the plurality of spring reception parts 85c are oriented toward the cup seal 75c and the plurality of cup seal holding parts 85d are oriented toward the spring 86. Further, the projection part 85e of the spring seat member 85 is arranged to project toward the retainer 81 to face the bottom 83 of the retainer 81. Thus, if the second slave piston 74 is fully stroked in a state where the spring seat member 85 is misassembled, the projection part 85e of the spring seat member 85 abuts on the bottom 83 of the retainer 81, making the stroke of the second slave piston 74 shorter by projection amount S1 of the projection part 85e. Therefore, by fully stroking the second slave piston 74 after assembly to measure stroke amount, whether the assembly of the spring seat member 85 is normal (whether misassembled) can be detected.

According to the cylinder device of the present embodiment described above, the projection part 85e allows for easily checking the assembly orientation of the spring seat member 85 in the regulation mechanism 80, to let the assembly orientation for the spring seat member 85 be easily recognized. Therefore, the spring seat member 85 can be suitably prevented from being misassembled. Further, after the assembly, whether the spring seat member 85 has been misassembled can be easily detected by fully stroking the second slave piston 74 to measure whether a stroke amount is changed due to the projection part 85e abutting on the retainer 81 (or depending on whether the projection part 85e abuts on the retainer 81).

Further, since the projection part 85e of the spring seat member 85 is formed by folding back the opening edge of the insertion hole 85b, the projection part 85e can be easily formed. Still further, the projection part 85e can be easily formed in a circumferential shape (in a cylindrical shape). It is noted that the projection part 85e is not limited to have the circumferential shape (cylindrical shape), as far as the projection part 85e has a shape that can be inserted in the enlarged diameter part 74b, and may have a tongue shape, for example.

Furthermore, since the enlarged diameter part 74b is formed at the opening of the screw hole 74a to have the projection part 85e inserted, the projection part 85e serves to position the spring seat member 85 at the time of assembly, allowing for improving assemblability.

Yet further, since the clearance is set between the insertion hole 85b in the spring seat member 85 and the bolt 84 and the end part 84d of the bolt 84 is pressed to contact on the bottom part 74e of the screw hole 74a by screwing, the bolt 84 is fixed to the second slave piston 74 in a compression-axis direction. Thus, axial force in the compression-axis direction can be suitably achieved without affecting the spring seat member 85 (without receiving the axial force of the bolt 84 on the spring seat member 85). Therefore, coupling strength of the bolt 84 can be improved while the spring seat member 85 can be prevented from being deformed. Since the coupling strength of the bolt 84 can be improved, the bolt 84 can preferably maintain the first slave piston 73 and the second slave piston 74 even when pressure acts in a direction to separate the first slave piston 73 from the second slave piston 74.

Also, since the screw hole 74a includes the female screw part 74c and the straight part 74d formed on the bottom part 74e of the female part 74c, and the bolt 84 includes the male part 84c and the end part 84d to be inserted in the straight part 74d, the axial force in the compression-axis direction can be obtained more stably at the bottom part 74e of the screw hole 74a than at a screwing part between the male screw part 84c and the female screw part 74c. Therefore, stable coupling strength can be maintained.

The present invention is suitably applicable to the slave cylinder device A2 in the vehicle brake system A.

In the above mentioned embodiment, the four spring reception parts 85c and the four cup seal holding parts 85d are formed, but the number thereof is not limited to four, and two or more parts may be arranged respectively.

In addition, the spring seat member 85 can have any shape. The spring seat member 85 can only be formed to have parts corresponding to the spring reception part 85*c*, the cup seal holding part 85*d* and the projection part 85*e*, and each of which can have any shape.

In the above mentioned embodiment, the present invention is applied to the cylinder device 70 of the slave cylinder device A2, but is not limitedly applied thereto, and may be applied to the brake hydraulic pressure generator A1.

In the above mentioned embodiment, the end surface 84*e* as an insertion end of the bolt is formed to have the planar surface (perpendicular surface) that is perpendicular to the axis of the bolt 84, but is not limited thereto, and may have a taper shape or a spherical shape.

Accordingly, the bottom part 74*e* of the screw hole 74*a* is formed to have the planar surface (perpendicular surface) that is perpendicular to the axis of the bolt 84, but is not limited thereto, and may have a taper shape or a spherical shape.

What is claimed is:

1. A cylinder device comprising:
   a front piston that is arranged on a front side at a bottom side of a bottomed cylinder hole;
   a rear piston that is arranged on a rear side of the cylinder hole; and
   a regulation mechanism that is arranged between the front piston and the rear piston to regulate separation distance between the front piston and the rear piston, wherein
   the regulation mechanism includes a retainer that is attached to the front piston, a bolt that has its head engaged with the retainer and is screwed in a screw hole formed in the rear piston, a spring seat member that is installed on the rear piston, and a spring that is compressively arranged between the retainer and the spring seat member,
   the spring seat member includes a spring reception part that projects toward the retainer to receive a rear end of the spring, a cup seal holding part that projects to an opposite side from the retainer of the spring reception part to hold a cup seal arranged on the rear piston, and a projection part that projects toward the opposite side from the retainer, and
   the projection part becomes abuttable on the retainer by a stroke of the rear piston if the spring reception part and the cup seal holding part are installed reversely-oriented on the rear piston.

2. The cylinder device according to claim 1, wherein the spring seat member includes an insertion hole through which the bolt is inserted, and the projection part is formed by folding back an opening edge of the insertion hole.

3. The cylinder device according to claim 2, wherein an enlarged diameter part is formed in an opening of the screw hole for inserting the projection part.

4. The cylinder device according to claim 2, wherein the bolt is inserted in the insertion hole of the spring seat member via clearance and screwed in the screw hole, to press an insertion end of the bolt to contact on a bottom of the screw hole.

5. The cylinder device according to claim 2, wherein
   the screw hole includes a female screw part that is formed on an opening side and a straight part that is formed on a bottom side continuously from the female screw part, and
   the bolt includes a male screw part that is screwed with the female screw part and an end part that is formed continuously from an end of the male screw part to be inserted in the straight part.

6. A vehicle brake system comprising the cylinder device according to claim 2, wherein
   the cylinder device is activated by an electric actuator to generate hydraulic pressure, and
   the vehicle brake system further comprises a brake hydraulic pressure generator that generates the hydraulic pressure in response to an input from a driver and a hydraulic pressure controller that performs brake control using the brake hydraulic pressure outputted from the slave cylinder device.

7. The cylinder device according to claim 1, wherein an enlarged diameter part is formed in an opening of the screw hole for inserting the projection part.

8. The cylinder device according to claim 7, wherein the bolt is inserted in an insertion hole of the spring seat member via clearance and screwed in the screw hole, to press an insertion end of the bolt to contact on a bottom of the screw hole.

9. The cylinder device according to claim 7, wherein
   the screw hole includes a female screw part that is formed on an opening side and a straight part that is formed on a bottom side continuously from the female screw part, and
   the bolt includes a male screw part that is screwed with the female screw part and an end part that is formed continuously from an end of the male screw part to be inserted in the straight part.

10. A vehicle brake system comprising the cylinder device according to claim 7, wherein
    the cylinder device is activated by an electric actuator to generate hydraulic pressure, and
    the vehicle brake system further comprises a brake hydraulic pressure generator that generates the hydraulic pressure in response to an input from a driver and a hydraulic pressure controller that performs brake control using the brake hydraulic pressure outputted from the slave cylinder device.

11. The cylinder device according to claim 1, wherein the bolt is inserted in an insertion hole of the spring seat member via clearance and screwed in the screw hole, to press an insertion end of the bolt to contact on a bottom of the screw hole.

12. The cylinder device according to claim 11, wherein
    the screw hole includes a female screw part that is formed on an opening side and a straight part that is formed on a bottom side continuously from the female screw part, and
    the bolt includes a male screw part that is screwed with the female screw part and the insertion end part that is formed continuously from an end of the male screw part to be inserted in the straight part.

13. A vehicle brake system comprising the cylinder device according to claim 1, wherein
    the cylinder device is activated by an electric actuator to generate hydraulic pressure, and
    the vehicle brake system further comprises a brake hydraulic pressure generator that generates the hydraulic pressure in response to an input from a driver and a hydraulic pressure controller that performs brake control using the brake hydraulic pressure outputted from the slave cylinder device.

14. The cylinder device according to claim 1, wherein
the screw hole includes a female screw part that is formed on an opening side and a straight part that is formed on a bottom side continuously from the female screw part, and
the bolt includes a male screw part that is screwed with the female screw part and an end part that is formed continuously from an end of the male screw part to be inserted in the straight part.

15. A vehicle brake system comprising the cylinder device according to claim 14, wherein
the cylinder device is activated by an electric actuator to generate hydraulic pressure, and
the vehicle brake system further comprises a brake hydraulic pressure generator that generates the hydraulic pressure in response to an input from a driver and a hydraulic pressure controller that performs brake control using the brake hydraulic pressure outputted from the slave cylinder device.

16. A vehicle brake system comprising the cylinder device according to claim 1, wherein
the cylinder device is activated by an electric actuator to generate hydraulic pressure, and
the vehicle brake system further comprises a brake hydraulic pressure generator that generates the hydraulic pressure in response to an input from a driver and a hydraulic pressure controller that performs brake control using the brake hydraulic pressure outputted from the slave cylinder device.

\* \* \* \* \*